US012085341B2

(12) United States Patent
Disler

(10) Patent No.: US 12,085,341 B2

(45) Date of Patent: Sep. 10, 2024

(54) APPARATUS AND PROCESS FOR PREDICTING METAL HEAT TREATMENT SYSTEM FAILURES

(71) Applicant: AFC-Holcroft, L.L.C., Wixom, MI (US)

(72) Inventor: William Disler, Wixom, MI (US)

(73) Assignee: AFC-Holcroft, L.L.C., Wixom, MI (US)

( * ) Notice: Subject to any disclaimer, the term of this patent is extended or adjusted under 35 U.S.C. 154(b) by 287 days.

(21) Appl. No.: 17/654,932

(22) Filed: Mar. 15, 2022

(65) Prior Publication Data

US 2023/0296322 A1 Sep. 21, 2023

(51) Int. Cl.

*C21D 9/00* (2006.01)
*C21D 11/00* (2006.01)
*F27D 21/00* (2006.01)

(52) U.S. Cl.

CPC .......... *F27D 21/0014* (2013.01); *C21D 11/00* (2013.01); *F27D 2021/0057* (2013.01)

(58) Field of Classification Search

CPC ........ C21D 9/00; C21D 9/0062; C21D 11/00; F27D 21/00; F27D 21/0014

See application file for complete search history.

(56) References Cited

U.S. PATENT DOCUMENTS 3,633,895 A * 1/1972 Genrich .................. C21D 1/63 266/250
5,837,187 A * 11/1998 Doersing .................. C22F 1/04 266/131
8,784,726 B2 * 7/2014 Ahlfeld ................ C21D 11/005 376/277
10,648,738 B2 * 5/2020 Custers .................... C21D 1/52
2014/0091063 A1 * 4/2014 Devani .............. B23K 26/0006 219/59.1
2023/0296322 A1 * 9/2023 Disler ................. F27D 21/0014 148/511

FOREIGN PATENT DOCUMENTS

DE 19600479 C2 * 12/1999 ............... C21D 1/63
DE 202007003738 U1 * 7/2007 ............. C21D 9/565
ES 2926146 T3 * 10/2022 ............. C21D 11/00

OTHER PUBLICATIONS

Endothermic Process and Heat Treatment Furnaces—CO and CO2 Control Considerations, dated Aug. 10, 2018, 4 pages.

(Continued)

*Primary Examiner* — Gregory A Wilson

(74) *Attorney, Agent, or Firm* — Gunther J. Evanina; BUTZEL LONG

(57) ABSTRACT

Apparatuses and processes for evaluating degradation and potential failure of components in an industrial heat treatment system include means and steps for establishing process settings for a baseline process cycle, collecting sensor data for at least one non-process control performance parameter during the baseline process cycle to establish a set of benchmark performance data, performing a calibration process cycle using the established process settings and collecting sensor data for the at least one non-process control performance parameter to establish a set of calibration performance data, and comparing the calibration performance data to the benchmark performance data.

17 Claims, 2 Drawing Sheets

(56) References Cited

OTHER PUBLICATIONS

Series 5000 EQ—Heavy Duty Elevator Quench Controlled Atmosphere Furnaces, dated Feb. 25, 2022, 4 pages.
Effective Integral Quench Furnace Maintenance, dated Feb. 9, 2021, 11 pages.
Heat Treating is not for the faint of heart, why heat-treating furnaces look the way they do, Part 2, dated May 15, 2018, 6 pages.

* cited by examiner

APPARATUS AND PROCESS FOR PREDICTING METAL HEAT TREATMENT SYSTEM FAILURES

FIELD OF THE DISCLOSURE

The disclosure relates to industrial furnace equipment used for heat treatment of metal parts, and more particularly to improvements that detect degradation and potential failure of components of the furnace equipment.

BACKGROUND OF THE DISCLOSURE

Industrial heat treatment furnace systems are used for economically improving the strength, hardness or other properties of steel and alloy parts, such as vehicle drive and axle components, vehicle transmission components, shafts, fasteners, bearing components, gears, castings, forgings, and precision machined components. Heat treating processes performed in industrial metal heat treating furnace systems include carburizing, carbonitriding, neutral hardening, ferritic nitrocarburizing, normalizing, annealing, spheroidize annealing and stress relieving. Such processes can, depending on the desired characteristics of the treated products and the composition of the products, involve several heating steps or stages at different temperatures, different atmospheric conditions, and different durations. Additionally, the parts being treated are typically quenched under controlled conditions and for a predetermined duration.

Generally, the duration of the treatment stages and the conditions at each stage must be precisely controlled to achieve product quality criteria. Typically, the industrial heat treatment furnace systems used to treat metal parts are automated and include process control systems to maintain the required conditions at each stage of the treatment process, to change conditions in accordance with a predetermined schedule, and to transfer the product load from the furnace chamber to the vestibule and/or quench bath after the furnace heat treatment has been concluded.

Heat treatment furnace components are subject to harsh conditions, including high temperatures, repeated thermal cycling, and heavy mechanical loads, which inevitably cause degradation and/or failure. Such degradation or failure of system components can result in scrapped product and lost production time.

SUMMARY OF THE DISCLOSURE

The apparatuses and processes of this disclosure employ sensors and a methodology that are useful for detecting degradation of metal heat treatment system components, preferably at an early stage, such that repair or replacement of failing components can be achieved before a failure causes a loss of production time and scraping of parts.

The improved heat treatment furnace systems of this disclosure incorporate sensors, such as position sensors and vibration sensors, that have not been typically involved in process control, but which can be used to evaluate component degradation and develop a performance data set during a baseline process cycle to provide a benchmark for equipment performance.

The process of this disclosure involves collecting data from the non-process control sensors during a standardized baseline or benchmark process cycle, at a later time collecting data from the non-process control sensors during a standardized calibration process cycle, and comparing the calibration cycle data to the benchmark cycle data to identify degradation of system components.

DETAILED DESCRIPTION

While the disclosed processes and systems will be described with respect to batch, sealed quench furnaces, the principles and apparatus of this disclosure are applicable to direct-formed furnace equipment, and continuous belt furnace systems.

The apparatuses and processes for monitoring and evaluating performance of a batch quench furnace system include a plurality of sensors for measuring critical operating parameters for a batch quench furnace. In certain aspects, the plurality of sensors, or sensor arrays, include novel combinations of sensors and quench furnace components or systems to facilitate early and rapid detection of failed or failing components in the quench furnace system.

Figure 1:
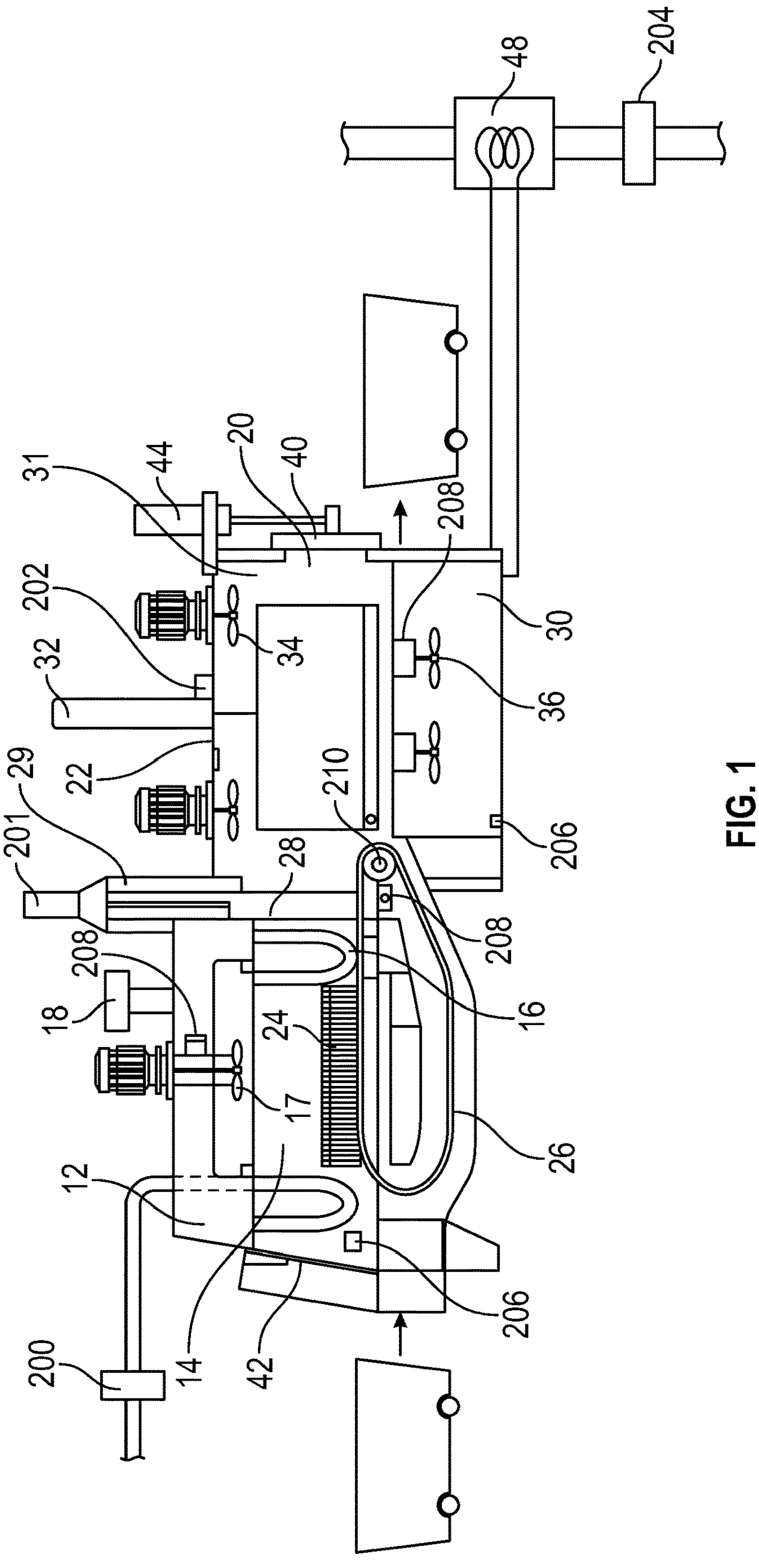
FIG. 1 is a schematic illustration of a straight-through sealed quench furnace.

A typical straight-through sealed quench furnace system is shown in FIG. 1. The furnace system 10 includes a furnace casing 12 defining a furnace chamber 14. Heating elements 16 are located with furnace chamber 14 to heat the chamber to a suitable heat treatment temperature. Heating elements 16 can be electric heating elements or indirect radiant tube burners (in which fuel, air and combustion products are isolated from the volume of the chamber occupied by the metal components or process load being treated. A fan 17 is provided to minimize temperature and gaseous component concentration gradients during the heat treatment.

An endothermic gas inlet 18 facilitates introduction of protective or carrier gas into the volume of the chamber in which a process load is treated. The endothermic gas typically comprises carbon dioxide (CO) in an amount of about 20 percent, hydrogen ($H_2$) in an amount of about 40 percent, and nitrogen ($N_2$) in an amount of about 40 percent. The endothermic gas is typically produced by an endothermic gas generator in which air and a fuel (e.g., natural gas, methane, propane) are catalytically reacted to produce primarily $CO_2$ and $H_2$. The endothermic gas should contain at most only trace amount of carbon dioxide ($CO_2$), water, and unburned hydrocarbons to avoid undesirable surface reaction such as oxidation. Additive gases can be metered into the endothermic gas introduced into the furnace chamber, or can be metered directly into the furnace chamber to achieve carburizing, nitriding, carbonitriding, or nitrocarburizing.

Adjacent the furnace chamber 14 is an enclosed quench chamber 20 defined by a quench casing 22. Furnace chamber 14 is isolated from quench chamber 20 during the heat treatment step of a metal surface treatment process. At the conclusion of the heat treatment step, the process load 24 is transferred from furnace chamber 14 to quench chamber 20 by a load transfer device, such as a conveyor chain. Before the process load is transferred from the furnace chamber to the quench chamber, an inner door 28 is raised by actuator 29 (e.g., an electric motor, pneumatic actuator or hydraulic actuator). After the process load is transferred into the quench chamber, inner door 28 is closed. Depending on the type of treatment, the process load can be slowly quenched in the vestibule (the volume of the quench chamber above liquid quench bath 30) in a gaseous environment, or lowered by elevator (or lift) 32 into bath 30. During atmospheric quench, quench fans 34 can be operated to minimize temperature gradients. During a liquid quench (e.g., in water or oil), both agitator(s) 36 can be operated to minimize temperature gradients and control the rate of cooling. The quench medium contained in the quench bath (e.g., oil) is typically heated in a heat exchange 48.

Figure 2:
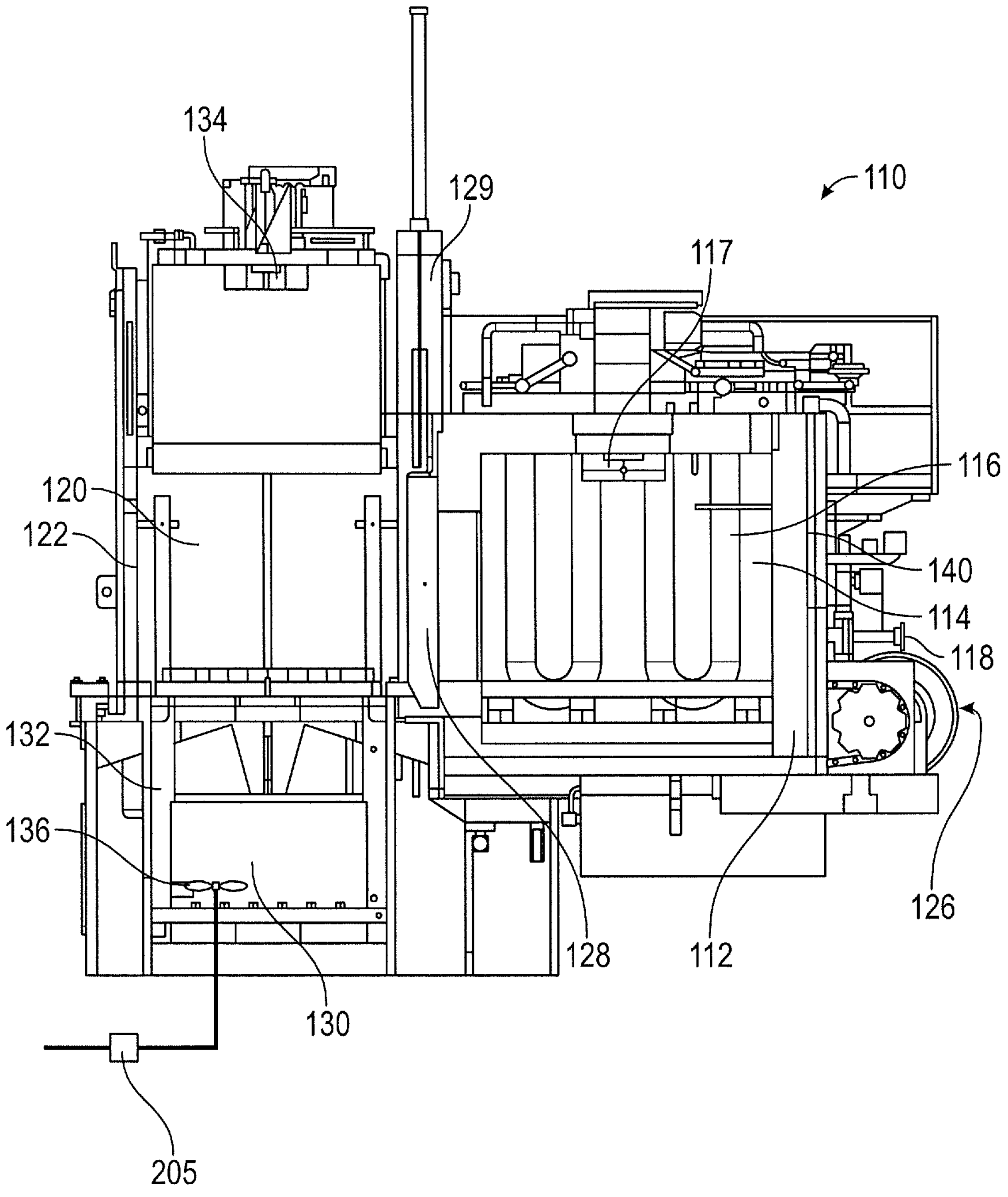
FIG. 2 is a schematic illustration of an in-out sealed quench furnace.

A typical in-out sealed quench furnace system 110 is shown in FIG. 2. System 110 includes many of the same components as system 10, including a furnace casing 112 defining a furnace chamber 114, heating elements 116, a furnace fan 117, an endothermic gas inlet 118, a quench chamber 120 defined by a quench casing 122, process load transfer device (e.g., chain conveyor) 126, inner door 128, inner door actuator 129, elevator (or lift) 132, quench fan(s) 134, quench bath 130, and bath agitator(s) 136. The primary difference between systems 10 and 110 is that the processed load exits through an outer door 40 at an end of the equipment (system 10) opposite load door 42 for the straight-through sealed quench furnace system 10, whereas for the in-out sealed quench furnace system, the process load enters and exits through the same load door 140. Outer door 40 can be raised and lowered by an actuator 44 (e.g., electric motor, pneumatic actuator, or hydraulic actuator).

Process parameters such as furnace atmospheric pressure and composition, furnace temperatures, heating times, quench times, quench temperatures must normally be controlled within narrow limits to achieve the desired product characteristics for a particular process load. Automated process control for batch quench furnace systems typically monitor and control furnace temperature, quench bath temperature, heating times and quench times. However, process control systems have not been used for, and generally are incapable of, detecting degradation of critical components in a batch quench furnace. Rather, degradation of critical components can, and often do, go unnoticed until there is a failure that cannot be accommodated by conventional process control systems.

The term non-process control sensors as used herein refers to sensors that have not customarily been used for controlling metal heat treatment equipment. To be more specific, furnace temperature, quench bath temperature, quench agitator intensity, heating times, and quench times are customarily controlled, and sensors used in controlling these parameters are regarded herein as process control sensors. In contrast, non-process control sensors used for detecting degradation of metal heat treatment components include sensors for evaluating energy inputted to apparatuses used to heat the furnace and quench bath (e.g., fuel flow meters, ammeters, etc.); position sensors; sensors used for measuring power to agitators, load transfer devices, and fans; and vibration sensors.

The disclosed metal heat treatment equipment incorporates sensors that provide information useful for detecting degradation of critical components and potentially predicting and preventing equipment failures that would otherwise result in lost productivity and scrapped products. In particular, the methods for detecting equipment degradation include sensors that are not present in conventional process control systems for industrial metal heat treatment systems. Such sensors include sensors 200 for evaluating energy input to the heating elements of the furnace (e.g., flow meters for evaluating fuel requirements to achieve a prescribed furnace temperature for a predetermined treatment on a predefined or standard process load, such as during a standard calibration cycle) or an ammeter for evaluating electrical energy supplied to electric heating elements in the furnace; position sensors 202 for detecting door (load, inner and outer) position which work in combination with a clock circuit of a processor to record the time needed to open and close doors; position sensors 202 for detecting elevator positions, which work with a clock circuit to record the time needed to lower the elevator into the quench bath and the time needed to raise the elevator out of the quench bath; sensors 204 for evaluating energy input to achieve and maintain target (set point) temperatures in the quench bath; and ammeters or other sensors 205 for evaluating power to quench bath agitators, furnace fans, and/or vestibule fans.

The disclosed method of evaluating metal heat treatment equipment performance may also utilize temperature sensors 206 (e.g., thermocouples) in combination with a processor (e.g., process controller or data acquisition processor) to record the time interval between furnace and/or quench bath set-point temperatures. Additionally, pressure sensors may be provided to record pressure during a heat treatment cycle.

Other sensors that may be employed to help evaluate the health of an industrial metal heat treatment system include vibration sensors 208 to quantify furnace roof fan vibrations, quench agitator vibrations, and load transfer device vibrations; and ammeters or other sensors 210 for evaluating power needed or used to move a process load from the furnace chamber into the vestibule.

The industrial furnace systems, apparatuses, and methods disclosed herein relate to improvements in establishing a benchmark or baseline comprising a collection of process parameters determined at a time when the industrial furnace system is performing acceptably under a prescribed set of conditions, tracking deviations from the baseline, and predicting potential failure or degradation of performance.

Baseline parameters are established by adjusting equipment setting for the system to achieve a desirable performance for a standard load. When a desirable performance (e.g., product quality) is achieved, all equipment settings are recorded for a standard baseline process cycle. During the processing cycle, various process parameters are collected to develop a benchmark. Periodically, randomly, or on any other basis, a calibration process cycle is repeated using the equipment settings established for the benchmark, recording the process parameters during the calibration process cycle, and comparing the process parameters from the calibration process cycle with those from the baseline (or benchmark) process cycle to detect significant discrepancies that indicate maintenance or part replacement may be needed to avoid further degradation or failure of system components. For example, higher fuel or electricity requirements for heating the furnace chamber might indicate fouling of radiant heating tubes, or defective heating elements, or damaged insulation. Longer temperature recovery time requirements for cooling the bath might indicate that recycling cooling system is defective. Deviations in the time for opening or closing furnace doors might suggest degradation or maladjustment of actuators. Regardless, the disclosed process provides a platform for diagnosing potential failures and developing correlations between deviations in process parameters and potential degradation and/or failure. Artificial intelligence can be employed for learning these correlations and predicting when maintenance and/or replacement of system components is needed to avoid defective production runs and reduce system downtime.

It is envisioned that the baseline performance data will comprise sensor readings when the batch quench furnace system has been adjusted or tuned to achieve near optimal performance, it being understood that optimum performance will be a subjective balance between various, sometimes competing criteria, such as product quality parameters, processing times, energy efficiency, and other considerations. Accordingly, baseline performance data refers to sensor readings when the batch quench furnace has been adjusted or tuned to achieve acceptable product quality and other performance criteria. Operation at such acceptable conditions at which baseline performance data is determined is referred to as a standard process cycle.

The baseline or benchmark equipment settings can, and preferably do, mimic typical or average actual production settings. For example, a typical or average production settings can be represented by a first heating stage or segment in which the furnace temperature is set to 1550° F., carbon content in the endothermic gas circulating through the furnace is set at 0.5 percent, the quench bath agitators are set to idle, the heating duration is set to 2 hours, the endothermic gas flow rate is set to high, and the quench bath is set to 100° F.; a second heating stage in which the furnace temperature is set to 1750° F., the carbon content of the endothermic gas is set to 1.1 percent, the quench bath agitators remain at idle, the duration (of the second heating stage) is set at 2 hours, the endothermic gas flow is maintained at a high level, and the quench bath temperature is set to 200° F.; a third heating stage in which the furnace temperature is set to 1550° F., the carbon content of the endothermic gas is set at 0.9 percent, the quench bath agitators remain in idle, the duration (of the third heating stage) is set to 1 hour, the endothermic gas flow remains high, and the quench bath temperature is maintained at 200° F.; a quench stage in which the quench bath agitators are set at 100 percent (maximum agitation) for 3 minutes, 50 percent for 3 minutes, and 25 percent (low agitation) for 3 minutes; an end stage in which the load tray is raised from the quench bath and allowed to drain; and a reset stage in which the furnace temperature is maintained at 1550° F., the quench bath temperature is returned to 100° F., and the carbon content of the endothermic gas is returned to 0.5 percent, to prepare for a subsequent process cycle. This exemplary process cycle can be run during collection of the initial baseline or benchmark performance data, and for subsequent calibration runs to evaluate system performance and identify potential degradation and/or failure of process equipment. The baseline and calibration process cycles can be performed with an empty load tray or with an actual load of metal parts or specimens that have not been previously treated (i.e., a so called "green load") or that have been fully treated (i.e., case hardened, carburized, nitrocarburized, etc.), provided that the loads for the baseline and calibration process runs are substantially identical.

The described embodiments are preferred and/or illustrated, but are not limiting. Various modifications are considered within the purview and scope of the appended claims.

The invention claimed is:

1. An industrial metal heat treatment system, comprising:
a furnace casing defining a furnace chamber;
a heating element within the furnace chamber for heating the furnace chamber to a heat treatment temperature;
an endothermic gas inlet to the furnace chamber;
a quench chamber including a vestibule adjacent the heating chamber, and a quench bath positioning below the vestibule;
an inner door movable between a closed position for isolating the furnace chamber from the quench chamber, and an open position to allow transfer of a process load from the furnace chamber to the quench chamber;
a load transfer device for moving the process load from the furnace chamber to the vestibule;
at least one quench bath agitator; and
at least one sensor for collecting non-process control data characteristic of an operational status of a component of the system to establish benchmark performance data during a baseline process cycle.

2. The system of claim 1, wherein the at least one sensor is selected from a sensor or method for measuring energy input to the heating element, a position sensor for determining the time needed to open and/or close the inner door, a power sensor or method to quantify quench agitator power, and a sensor for quantifying power to operate the load transfer device.

3. The system of claim 1, wherein the heating element is an electrical resistance heater, and the at least one sensor or method is for quantifying electric power to the heater.

4. The system of claim 1, wherein the heating element is an indirect radiant tube burner, and the at least one sensor is an input measuring device for quantifying the amount of fuel delivered to the indirect radiant tube burner.

5. The system of claim 1, further comprising an elevator for lowering the process load into the quench bath, and wherein the at least one sensor includes position sensors for determining the time needed to lower the process load into the quench bath and/or the time needed to raise the process load from the quench bath.

6. The system of claim 1, further comprising a quench bath agitator and a device for determining energy use of the agitator.

7. An industrial metal heat treatment system, comprising:
a furnace casing defining a furnace chamber;
a heating element for heating the furnace chamber to a heat treatment temperature;
a load transfer device for moving a process load through the furnace chamber or out of the furnace chamber; and
at least one sensor for collecting non-process control data characteristic of an operational status of a component of the system to establish benchmark performance data during a baseline process cycle; and
wherein the heating element is an indirect radiant tube burner, and the at least one sensor is a device or method for quantifying the amount of fuel delivered to the indirect radiant tube burner.

8. The system of claim 7, wherein the at least one sensor is selected from a device for measuring energy input to the heating element, and a sensor for quantifying power to operate the load transfer device.

9. The system of claim 7, wherein the heating element is an electrical resistance heater, and the at least one sensor is a device for quantifying electric power to the heater.

10. The system of claim 7, further comprising an elevator for lowering the process load into a quench bath, and wherein the at least one sensor includes position sensors for determining the time needed to lower the process load into a quench bath and/or the time needed to raise the process load from a quench bath.

11. The system of claim 7, further comprising a quench bath agitator and a power detector for quantifying failures of the agitator.

12. A process for evaluating degradation and potential failure of components of an industrial heat treatment system, comprising:
establishing process settings for a baseline process cycle;
collecting sensor data for at least one non-process control performance parameter during the baseline process cycle to establish a set of benchmark performance data;

performing a calibration process cycle using the established process settings and collecting sensor data for the at least one non-process control performance parameter to establish a set of calibration performance data; and comparing the calibration performance data to the benchmark performance data to evaluate performance degradation of system components.

13. The process of claim 12, wherein the industrial heat treatment system comprises: a furnace casing defining a furnace chamber; a heating element for heating the furnace chamber to a heat treatment temperature; a load transfer device for moving a process load through the furnace chamber or out of the furnace chamber; and at least one sensor selected from a sensor for measuring energy input to the heating element, a power sensor to quantify load transfer device changes, and a sensor for quantifying power to operate the load transfer device.

14. The process of claim 13, wherein the heating element is an electrical (Original) resistance heater, and the at least one sensor is a device for quantifying electric power to the heater.

15. The process of claim 13, wherein the heating element is an indirect radiant tube burner, and the at least one sensor is a device or method for quantifying the amount of fuel delivered to the indirect radiant tube burner.

16. The process of claim 13, further comprising an elevator for lowering the process load into a quench bath, and wherein the at least one sensor includes position sensors for determining the time needed to lower the process load into a quench bath and/or the time needed to raise the process load from a quench bath.

17. The process of claim 13, further comprising a quench bath agitator and power detector for quantifying failures of the agitator.

* * * * *